Patented May 3, 1949

2,469,101

UNITED STATES PATENT OFFICE 2,469,101

METHOD OF PRESERVING RUBBER

Edward S. Blake, Nitro, W. Va., assignor to Monsanto Chemical Company, St. Louis, Mo., a corporation of Delaware No Drawing. Application December 22, 1945, Serial No. 637,093

8 Claims. (Cl. 260—810)

The present invention relates to a method of retarding or preventing the deterioration of a rubber due to aging or exposure to the atmosphere and to the rubber compositions so obtained. It has long been known that such deterioration can be greatly retarded by treating the rubber before or after vulcanization with certain substances known as age-resisters or antioxidants. One object of this invention is to provide a superior class of antioxidants for a rubber.

The antioxidants or age-resisters of the present invention are obtained by condensing a phenol with a polyhydric alcohol having two hydroxy groups linked to separate carbon atoms separated by one intervening carbon atom. It has been discovered that these condensation products comprise an effective group of antioxidants and possess the advantage that they do not discolor the rubber.

Examples of the new antioxidants comprise the condensation products of a phenol and any of the following alcohols: 1,3-propane diol, 1,3-butane diol, 2-methyl 1,3-butane diol, 2,4-pentane diol, 2-methyl, 2,4-pentane diol, 3-methyl 1,3-butane diol, 3-methyl 2,4-pentane diol and 2,4-dimethyl 2,4-pentane diol. These beta dihydroxy alcohols may be condensed with either mono or polyhydric phenols as for example phenol, hydroquinone, resorcinol, cathechol, o-chlor phenol, p-tertiary butyl phenol, p-methoxy phenol, beta naphthol, the xylenols, thymol, carvacrol and the like.

Condensation of the alcohol with the phenol may be effected easily by the aid of suitable condensation agents. Such agents as aluminum chloride, zinc chloride, phosphoric acid and sulfuric acid are typical examples of suitable condensing agents.

The composite reaction products are satisfactory for use as antioxidants but may be further purified where desired. Since the chemical structure of the condensation products is uncertain, the invention is not limited to any particular configuration or theory of the structure of the products produced.

The following detailed examples illustrate the preparation of the new antioxidants and are not to be taken as limitative of the invention.

EXAMPLE I

Into a suitable reactor fitted with a thermometer, stirrer and condenser, and provided with an arrangement for cooling the reactor contents, there was charged 800 parts by weight of petroleum hydrocarbon solvent, 280 parts by weight of 2-methyl 2,4-pentane diol and 110 parts by weight of hydroquinone. 40 parts by weight of concentrated sulfuric acid was then added and the mixture gradually heated with stirring to about 70° C. A vigorous reaction set in as the charge was heated. Stirring was continued for about 50 minutes at 75–78° C. and the lower acid layer was drawn off and discarded. The solvent layer was washed with water and then with dilute bicarbonate solution until neutral, dried, filtered and the solvent removed by distillation. Any unreacted constituents not washed out were then removed by distillation up to 93° C. vapor temperature at 7 mm. pressure. The composite reaction product consisted of 240 parts by weight of a thick dark amber liquid.

The analytical data indicates that the heavy liquid product which is an effective antioxidant contains only one active hydroxy group and that at least two mols of the alcohol condense with hydroquinone. However, several structures fit the analytical data.

EXAMPLE II

A reactor with an arrangement for cooling the contents and fitted with a thermometer, stirrer and reflux condenser was charged with 55 parts by weight of resorcinol, 158 parts by weight of 2-methyl 2,4-pentane diol and 200 parts by weight of a petroleum hydrocarbon solvent. 40 parts by weight of concentrated sulfuric acid was then slowly added and the charge heated carefully. The reaction was particularly vigorous at 70° C., cooling being required. After heating at 70–75° C. for about an hour, the bottom acid layer was drawn off and the solvent layer washed with dilute sodium bicarbonate solution until neutral, dried and filtered. The solvent was removed by distillation and the residue freed from constituents of high volatility by topping up to 93° C. at 3 mm. pressure. The desired reaction product was obtained as a clear light amber soft resinous product. The yield was 141 parts by weight.

EXAMPLE III

The resorcinol of Example II was replaced by 55 parts by weight of catechol and the example repeated as described. The reaction was less vigorous and the yield somewhat less. 132 parts by weight of a dark amber viscous oil was obtained.

EXAMPLE IV

Into a suitable reactor fitted with a reflux condenser there was charged 94 parts by weight of phenol, 118 parts by weight of 2-methyl 2,4-pentane diol, and 136 parts by weight of anhydrous zinc chloride. The mixture was heated for three hours at 155° C., cooled, dissolved in a solvent as for example benzene, and washed with water, dilute sodium bicarbonate solution and water again until neutral. The benzene solution was dried, then filtered and the solvent removed by distillation. The residue was freed from constituents of high volatility by topping up to 95° C. at 4–5 mm. pressure. In this manner there was obtained 140 parts by weight of a thick oily liquid. It's desirable antioxidant properties are described below.

As specific embodiments of the invention illustrating the invention but not limiting the same, stocks were compounded comprising

|  | Stock | | | | |
| --- | --- | --- | --- | --- | --- |
|  | A | B | C | D | E |
|  | Parts by weight | Parts by weight | Parts by weight | Parts by weight | Parts by weight |
| Smoked sheet rubber | 100 | 100 | 100 | 100 | 100 |
| Zinc oxide | 60 | 60 | 60 | 60 | 60 |
| Lithopone | 20 | 20 | 20 | 20 | 20 |
| Sulfur | 2 | 2 | 2 | 2 | 2 |
| Diphenyl guanidine phthalate | 0.675 | 0.675 | 0.675 | 0.675 | 0.675 |
| Benzoyl thio benzothiazole | 0.825 | 0.825 | 0.825 | 0.825 | 0.825 |
| Paraffin | 0.25 | 0.25 | 0.25 | 0.25 | 0.25 |
| Condensation product of hydroquinone and 2-methyl 2,4-pentane diol |  | 1.0 |  |  |  |
| Condensation product of resorcinol and 2-methyl 2,4-pentane diol |  |  | 1.0 |  |  |
| Condensation product of catechol and 2-methyl 2,4-pentane diol |  |  |  | 1.0 |  |
| Condensation product of phenol and 2-methyl 2,4-pentane diol |  |  |  |  | 1.0 |

The stocks so compounded were cured in the usual manner by heating for different periods of time in a press at 126° C. The cured products were then artificially aged by heating in a bomb at 121° C. under 80 pounds air pressure per square inch. The modulus and tensile properties of the stocks before and after aging are set forth in the table below.

*Table I*

| Stock | Cure Time in Mins. | Unaged | | | Aged | | |
| --- | --- | --- | --- | --- | --- | --- | --- |
|  |  | Modulus of Elasticity in lbs./in.$^2$ at 300% Elongation | Tensile at Break in lbs./in.$^2$ | Ult. Elong., Per Cent | Modulus of Elasticity in lbs./in.$^2$ at 300% Elongation | Tensile at Break in lbs./in.$^2$ | Ult. Elong., Per Cent |
| A | 45 | 595 | 3,805 | 665 | 240 | 350 | 460 |
| B | 45 | 570 | 4,050 | 690 | 675 | 2,535 | 600 |
| C | 45 | 550 | 3,750 | 670 | 435 | 1,540 | 570 |
| D | 45 | 455 | 3,700 | 700 | 435 | 1,490 | 595 |
| E | 45 | 525 | 3,790 | 660 | 490 | 1,615 | 580 |
| A | 60 | 560 | 3,345 | 630 | 640 | 640 | 500 |
| B | 60 | 580 | 3,520 | 600 | 635 | 1,645 | 500 |
| C | 60 | 580 | 3,655 | 655 | 435 | 1,410 | 575 |
| D | 60 | 520 | 3,620 | 675 | 325 | 1,070 | 570 |
| E | 60 | 570 | 3,810 | 660 | 410 | 1,575 | 590 |

Comparison with the A stock which contains no antioxidant shows that the stocks containing the new antioxidants are markedly resistant to deterioration.

Obviously, practice of this invention is not limited to the specific compositions given above, such compositions being merely illustrative of the manner of employing the antioxidants or age-resistors of this invention. The antioxidants or age-resisters may be employed in conjunction with other vulcanizing agents than those specifically disclosed, for this invention is applicable generally to pure rubber or rubber compositions of the most varied nature. Furthermore, the preferred class of material may be employed in conjunction with other accelerators than those specifically shown with varying differences of tensile and modulus properties but still exhibiting the desirable properties of the class.

The term "treating" as employed in the appended claims is used in a generic sense to include either the incorporating of the preferred class of materials into the rubber by milling or similar process or their addition to the rubber latex before its coagulation, or the application thereof to the surface of a mass of crude or vulcanized rubber. The term "a rubber" is likewise employed in a generic sense to define a sulfur vulcanizable plastic material which possesses high extensibility under load coupled with the property of forcibly retracting to approximately its original size and shape after the load is removed. Examples of these products are India rubber, reclaimed rubber, balata, gutta percha, copolymers of butadiene-1,3 and styrene and butadiene-1,3 and acrylic nitrile and other natural or synthetically prepared vulcanizable products which deteriorate upon aging or exposure to the atmosphere by absorption of oxygen, whether or not admixed with fillers, pigments or accelerating agents.

The present invention is limited solely by the claims attached hereto as part of the present specification.

What is claimed is:

1. The method of preserving a rubber which comprises treating a sulfur vulcanizable rubber with the condensation product of hydroquinone and 2-methyl 2,4-pentane diol produced in the presence of an acidic condensation catalyst.

2. The method of preserving India rubber which comprises treating India rubber with the condensation product of hydroquinone and 2-methyl 2,4-pentane diol produced in the presence of an acidic condensation catalyst.

3. The vulcanized rubber product obtained by treating a sulfur vulcanizable rubber with the condensation product of hydroquinone and 2- methyl 2,4-pentane diol produced in the presence of an acidic condensation catalyst.

4. The vulcanized rubber product obtained by treating India rubber with the condensation product of hydroquinone and 2-methyl 2,4-pentane diol produced in the absence of an acidic condensation catalyst.

5. The method of preserving a rubber which comprises treating a sulfur vulcanizable rubber with a small amount of the condensation product of a dihydroxy substituted benzene having the empirical formula $C_6H_6O_2$ and a dihydric alcohol having the two hydroxy groups linked to carbon atoms separated by a methylene group said product being produced by condensing substantially one molecular proportion of the dihydroxy benzene with at least about two molecular proportions of the dihydroxy alcohol in the presence of an acidic condensation catalyst.

6. The method of preserving a rubber which comprises treating a sulfur vulcanizable rubber with a small amount of the condensation product of a dihydroxy substituted benzene having the empirical formula $C_6H_6O_2$ and 2-methyl 2,4-pentane diol produced by condensing substantially one molecular proportion of the dihydroxy benzene with at least about two molecular proportions of the diol in the presence of an acidic condensation catalyst.

7. The vulcanized rubber product obtained by treating a sulfur vulcanizable rubber with a small amount of the condensation product of a dihydroxy substituted benzene having the empirical formula $C_6H_6O_2$ and a dihydric alcohol having the two hydroxy groups linked to carbon atoms separated by a methylene group said product being produced by condensing substantially one molecular proportion of the dihydroxy benzene with at least about two molecular proportions of the dihydroxy alcohol in the presence of an acidic condensation catalyst.

8. The vulcanized rubber product obtained by treating a sulfur vulcanizable rubber with a small amount of the condensation product of a dihydroxy substituted benzene having the empirical formula $C_6H_6O_2$ and 2-methyl 2,4-pentane diol produced by condensing substantially one molecular proportion of the dihydroxy benzene with at least about two molecular proportions of the diol in the presence of an acidic condensation catalyst.

EDWARD S. BLAKE.

REFERENCES CITED

The following references are of record in the file of this patent:

UNITED STATES PATENTS

| Number | Name | Date |
|---|---|---|
| 1,989,788 | Calcott | Feb. 5, 1935 |
| 2,198,374 | Bruson | Apr. 23, 1940 |

FOREIGN PATENTS

| Number | Country | Date |
|---|---|---|
| 620,751 | Germany | Oct. 25, 1935 |
| 497,418 | Great Britain | June 20, 1936 |